US011165935B2

(12) United States Patent
Tada

(10) Patent No.: US 11,165,935 B2
(45) Date of Patent: Nov. 2, 2021

(54) IMAGING DEVICE

(71) Applicant: Takashi Tada, Saitama (JP)

(72) Inventor: Takashi Tada, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/745,390

(22) Filed: Jan. 17, 2020

(65) Prior Publication Data

US 2020/0252529 A1    Aug. 6, 2020

(30) Foreign Application Priority Data

Jan. 31, 2019  (JP) .............................. JP2019-015063

(51) Int. Cl.
*H04N 5/225*  (2006.01)
(52) U.S. Cl.
CPC ....... *H04N 5/22521* (2018.08); *H04N 5/2252* (2013.01); *H04N 5/2253* (2013.01); *H04N 5/2254* (2013.01)
(58) Field of Classification Search
CPC ............. H04N 5/22521; H04N 5/2252; H04N 5/2253; H04N 5/2254
USPC ........................................................ 348/373
See application file for complete search history.

(56) References Cited

U.S. PATENT DOCUMENTS

| | | | | |
|---|---|---|---|---|
| 9,652,667 B2* | 5/2017 | MacMillan | .......... | H04N 13/106 |
| 9,686,468 B2* | 6/2017 | Eromaki | ............ | H04N 5/23238 |
| 9,774,798 B1* | 9/2017 | Evans, V | ........... | G02B 27/1066 |
| 9,854,164 B1* | 12/2017 | Kozko | .................... | G02B 13/06 |
| 9,930,225 B2* | 3/2018 | Villmer | .................... | H04N 1/00 |
| 9,961,242 B2* | 5/2018 | Oh | .......................... | B60R 11/04 |
| 9,992,414 B2* | 6/2018 | Masuda | ............... | H04N 5/2254 |
| 10,212,351 B2* | 2/2019 | Irie | ........................ | G06F 3/0488 |
| 10,264,302 B2* | 4/2019 | Morita | ..................... | H04N 7/15 |
| 10,721,116 B2* | 7/2020 | Yoshida | ................ | H04L 65/403 |
| 10,778,865 B2* | 9/2020 | Morita | .................. | H04N 7/142 |
| 10,819,912 B2* | 10/2020 | Jin | ..................... | H04N 5/23287 |
| 2005/0088762 A1* | 4/2005 | Ohashi | .................. | G02B 13/22 359/754 |
| 2010/0045773 A1* | 2/2010 | Ritchey | .................. | G02B 13/06 348/36 |
| 2011/0102668 A1 | 5/2011 | Kaga et al. | | |
| 2011/0109790 A1 | 5/2011 | Shinohara et al. | | |
| 2011/0216237 A1 | 9/2011 | Shinohara et al. | | |
| 2011/0298970 A1 | 12/2011 | Shinohara et al. | | |
| 2012/0154665 A1 | 6/2012 | Kaga et al. | | |
| 2013/0326419 A1* | 12/2013 | Harada | ............. | H04N 5/23238 715/838 |
| 2014/0071226 A1 | 3/2014 | Satoh et al. | | |
| 2014/0152852 A1* | 6/2014 | Ito | ..................... | H04N 1/32122 348/207.1 |

(Continued)

FOREIGN PATENT DOCUMENTS

JP    2012-004780    1/2012
JP    2014-056048    3/2014

*Primary Examiner* — Pritham D Prabhakher
(74) *Attorney, Agent, or Firm* — Xsensus LLP

(57) ABSTRACT

An imaging device includes a casing, a plurality of optical systems disposed in the casing, a plurality of image sensors, disposed in the casing, for generating images captured by using the plurality of optical systems, a heat generation member disposed in the casing, and a pair of sandwiching members disposed in the casing to sandwich the heat generation member between the pair of members.

20 Claims, 11 Drawing Sheets

(56) References Cited

U.S. PATENT DOCUMENTS

| | | | |
|---|---|---|---|
| 2014/0218468 A1* | 8/2014 | Gao | G02B 27/283 |
| | | | 348/36 |
| 2016/0048942 A1* | 2/2016 | Irie | G06T 11/00 |
| | | | 345/619 |
| 2016/0165136 A1* | 6/2016 | Mitsui | H04N 5/23238 |
| | | | 348/36 |
| 2016/0227078 A1* | 8/2016 | Oh | H04N 5/374 |
| 2018/0267390 A1* | 9/2018 | Kim | G03B 17/55 |
| 2019/0041909 A1* | 2/2019 | Pakula | G06F 1/26 |
| 2019/0082110 A1* | 3/2019 | Jin | G06T 7/70 |
| 2019/0113826 A1* | 4/2019 | Nam | G03B 17/08 |
| 2019/0191062 A1* | 6/2019 | Ko | H04N 5/2253 |
| 2019/0248302 A1* | 8/2019 | Lee | H04N 5/2257 |
| 2019/0349516 A1* | 11/2019 | Lee | H04N 5/265 |
| 2020/0348481 A1* | 11/2020 | Toriumi | G02B 7/021 |

* cited by examiner

FIG. 1A
FIG. 1B
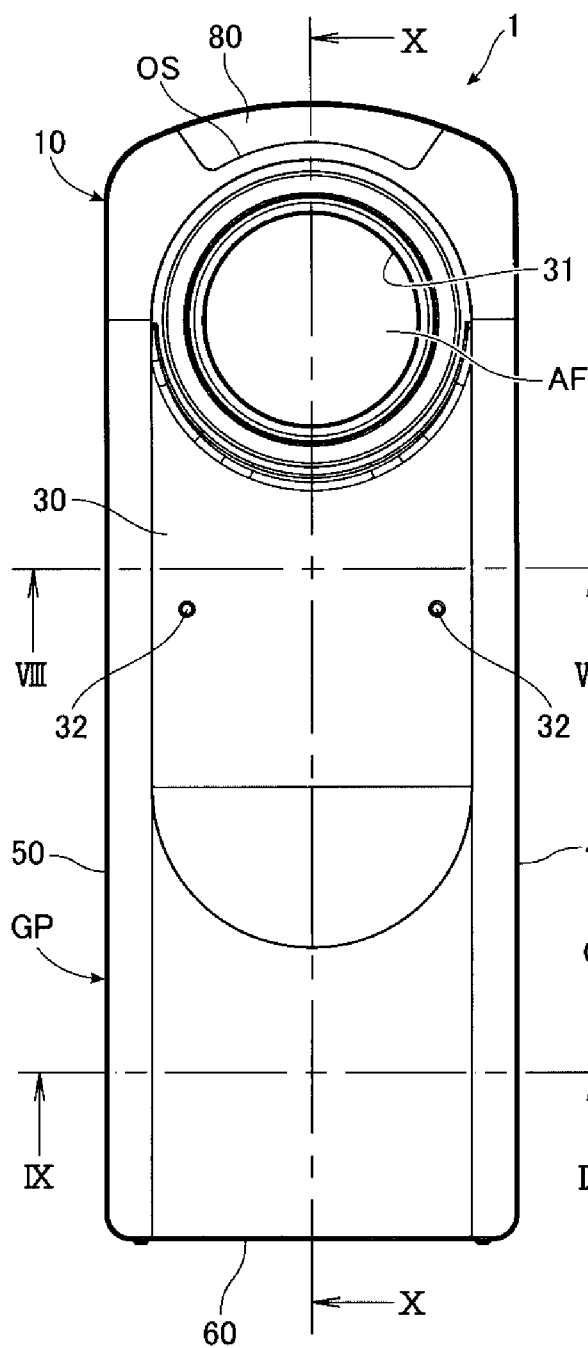
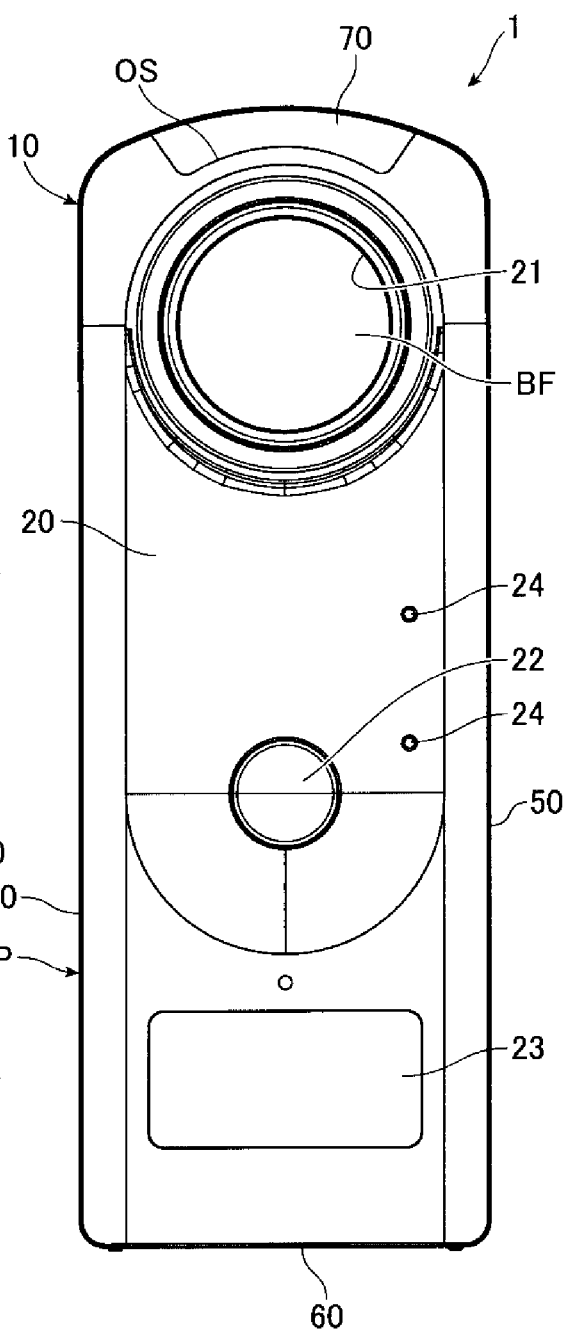
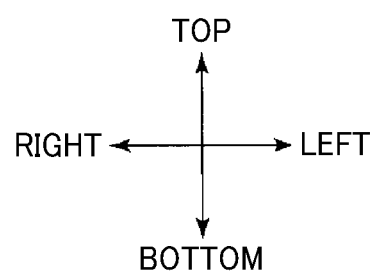
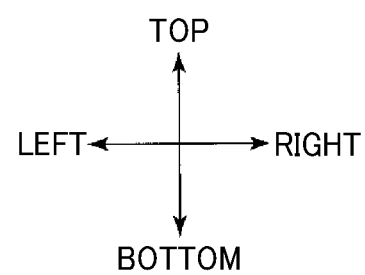

IMAGING DEVICE

CROSS-REFERENCE TO RELATED APPLICATION

This application claims priority pursuant to 35 U.S.C. § 119(a) to Japanese Patent Application No. 2019-015063, filed on Jan. 31, 2019 in the Japan Patent Office, the disclosure of which is incorporated by reference herein in its entirety.

BACKGROUND

Technical Field

This disclosure relates to an imaging device.

Background Art

Some digital cameras including heat generating sources inside camera bodies are designed to efficiently diffuse or dissipate heat generated by the heat generating sources to reduce undesired feeling caused by the generated heat when users hold the camera bodies, and reducing a local temperature rise inside the camera bodies. For example, the digital camera includes a first thermal storage member and a second thermal storage member. The first heat storage member is disposed inside a grip portion of the camera body, and the heat generated by the heat generating source inside the camera body is conducted to the first heat storage member. The second heat storage member is disposed inside the camera body near a strobe device section away from the grip portion, and the heat generated by the heat generating source inside the camera body is conducted to the second heat storage member. A space between an inner surface of an outer cover and the second heat storage member disposed at the strobe device section is set smaller than a space between the inner surface of the outer cover and the first thermal storage member at the grip portion.

Further, an imaging system (imaging device) capable of capturing a full-view spherical image includes two imaging units, each is configured as a combination of a wide-angle lens having an angle of view greater than 180 degrees and an image sensor used for capturing images using the wide-angle lens, and images captured by the two imaging units are synthesized to obtain an image having a stereoscopic angle of 4π radians.

Such conventional imaging system (imaging device) includes a heat generation member inside a casing of the imaging system (imaging device). The heat generation member can be, for example, a substrate deposited with digital signal processors (DSPs) that receive image signals from the two image sensors and processes the image signals.

The conventional imaging system (imaging device) may not be configured to effectively reduce the heat conduction from the heat generation member to the casing. For example, when the heat generated by the heat generation member is conducted to the grip portion of the casing, users may have an uncomfortable feeling and adversely affect the image capturing operation.

SUMMARY

In one aspect of the present invention, an imaging device is devised. The imaging device includes a casing, a plurality of optical systems disposed in the casing, a plurality of image sensors, disposed in the casing, for generating images captured by using the plurality of optical systems, a heat generation member disposed in the casing, and a pair of sandwiching members disposed in the casing to sandwich the heat generation member between the pair of members.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 1A and 1B illustrate an external configuration of an imaging device according to an embodiment viewed from a front side and a rear side;

Figure 2A:
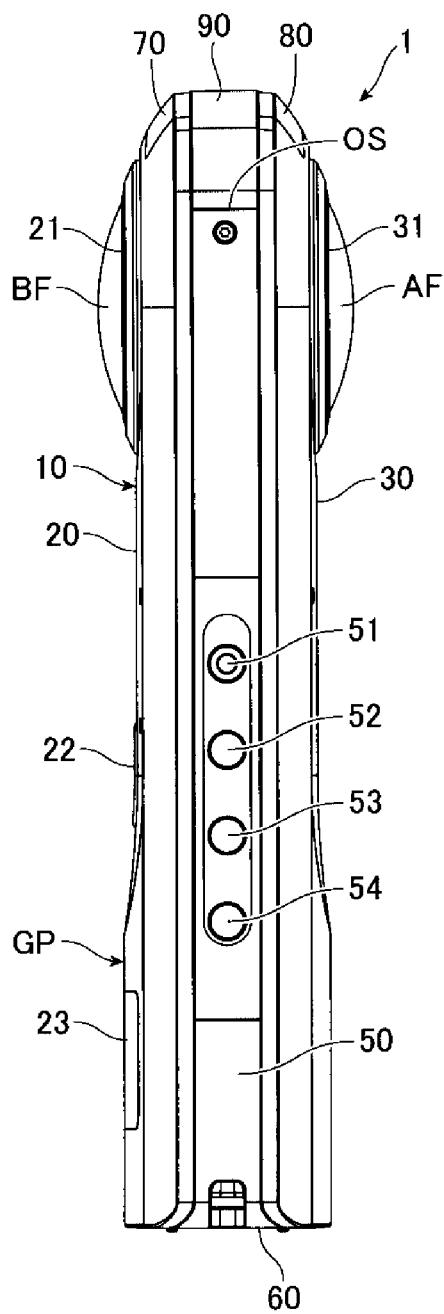
FIGS. 2A and 2B illustrate an external configuration of an imaging device according to an embodiment viewed from a right side and a left side.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an imaging device 1 according to an embodiment with reference to FIGS. 1 to 12. In this description, directions in front, rear, upper, bottom, left and right correspond to arrow directions described in each drawing. Further, the left-to-right direction corresponds to a width direction (horizontal direction), and the front-to-rear direction corresponds to a thickness direction (depth direction).

As illustrated in six-sided views of FIGS. 1A and 1B, 2A and 2B, and 3A and 3B, the imaging device 1 includes, for example, a casing 10, in which each of components of the imaging device 1 is assembled and held inside or outside the casing 10. For example, the casing 10 has a contour, which is short along the left-to-right direction, long along the top-to-bottom direction, having a given thickness along the front-to-rear direction, and a given rounded profile at a top side.

The casing 10 includes, for example, a rear-side metal casing 20 and a front-side metal casing 30. The rear-side metal casing 20 and the front-side metal casing 30 can be formed as a composite molded casing composed of a relatively higher rigidity metal material (e.g., magnesium alloy) compared to a rear-side resin casing 70, a front-side resin casing 80, and a connection resin casing 90 to be described later.

The rear-side metal casing 20 and the front-side metal casing 30 are connected by a left-side connection casing 40, a right-side connection casing 50 and a bottom-side connection casing 60. The left-side connection casing 40, the right-side connection casing 50 and the bottom-side connection casing 60 can be made of, for example, the same metal material as the rear-side metal casing 20 and the front-side metal casing 30, but there is a degree of freedom in the material and various design changes can be made as needed.

A positioning boss is formed in any one of the rear-side metal casing 20 and the front-side metal casing 30, and a boss insertion hole is formed on the other one of the rear-side metal casing 20 and the front-side metal casing 30, so that the rear-side metal casing 20 and the front-side metal casing 30 are positioned at close proximity when the positioning boss is inserted into the boss insertion hole. Further, each of the rear-side metal casing 20 and the front-side metal casing 30 includes screw holes at the left-side face, the right-side face, and the bottom face, which overlap with each other when the positioning boss is inserted into the boss insertion hole (positioning state).

Further, the left-side connection casing 40, the right-side connection casing 50 and the bottom-side connection casing 60 are fitted into a gap between the rear-side metal casing 20 and the front-side metal casing 30, and then common screws are screwed (tightened) into the respective screw holes, with which the rear-side metal casing 20, the front-side metal casing 30, the left-side connection casing 40, the right-side connection casing 50 and the bottom-side connection casing 60 are integrated as one casing. Further, the configuration of integrating the rear-side metal casing 20, the front-side metal casing 30, the left-side connection casing 40, the right-side connection casing 50 and the bottom-side connection casing 60 has a given degree of freedom, and various design changes can be made as needed.

Further, a lens exposure hole 21 having a circular shape is formed at a upper portion of the rear-side metal casing 20, and a lens exposure hole 31 having a circular shape is formed at a upper portion of the front-side metal casing 30.

Further, a shutter button 22 serving as a trigger for initiating an image capturing operation (i.e., still image capture, movie image capture) is provided slightly below a middle portion in the top-to-bottom direction of the rear-side metal casing 20.

Further, a display unit 23 is provided below the shutter button 22, for displaying various information, such as an operation screen and a setting screen of the imaging device 1. The display unit 23 can be formed of, for example, an organic electro-luminescence (OEL) display.

Figure 2B:
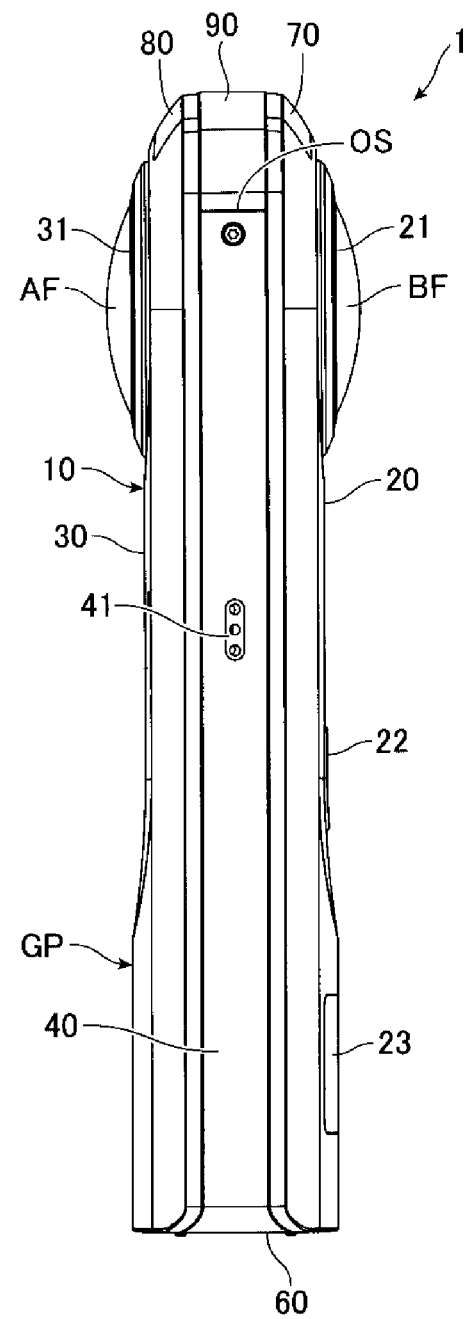
Figure 3A:
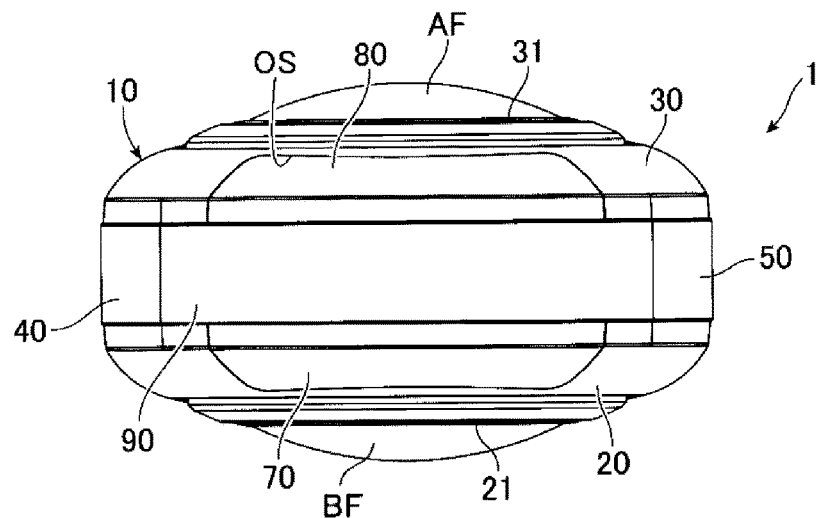
FIGS. 3A and 3B illustrate an external configuration of an imaging device according to an embodiment viewed from a top side and a bottom side.
Figure 3A:
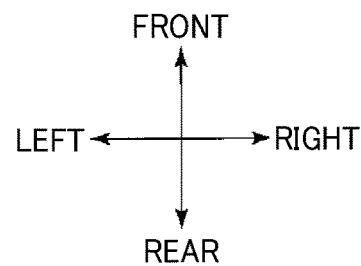
Figure 3B:
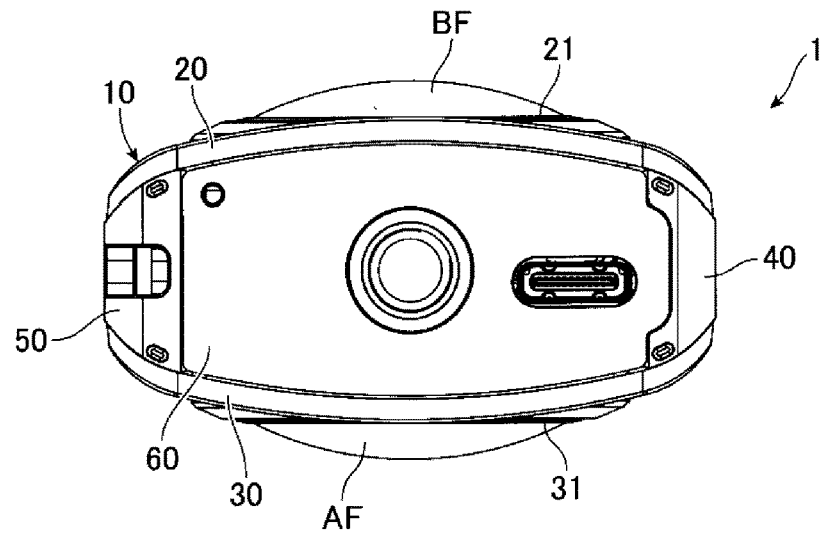
Figure 3B:
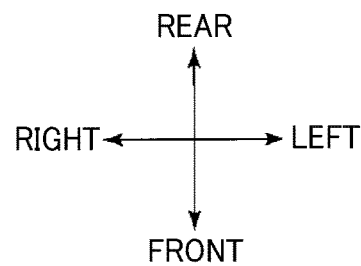

Further, as illustrated in FIG. 2B, a speaker 41 that outputs audio, for example, voice guide messages, is provided at a middle portion in the top-to-bottom direction (vertical direction) of the left-side connecting casing 40.

Further, as illustrated in FIG. 2A, a power button 51 is provided at a middle portion in the top-to-bottom direction of the right-side connection casing 50 to switch on and off the power supply of the imaging device 1, and operation buttons 52, 53 and 54 are provided below the power button 51 to perform setting operations, such as an image capturing mode and a wireless connection mode.

Further, as illustrated in FIG. 1B, two microphones 24 are provided at given positions above and right-side of the shutter button 22 of the rear-side metal casing 20 while the two microphones 24 are spaced apart from each other in the top-to-bottom direction (vertical direction).

Further, as illustrated in FIG. 1A, two microphones 32 are provided at given positions slightly above the middle portion in the top-to-bottom direction (vertical direction) of the front-side metal casing 30 while the two microphones 32 are spaced apart from each other in the left-to-right direction (horizontal direction).

Therefore, a total of four microphones disposed at the front and rear sides (i.e., two microphones 24 of the rear-side metal casing 20 and two microphones 32 of the front-side metal casing 30) can be used to acquire stereophonic sound or three-dimensional sound (e.g., voice).

Further, as illustrated in FIGS. 1A and 1B, and 2A and 2B, when the rear-side metal casing 20, the front-side metal casing 30, the left-side connection casing 40, the right-side connection casing 50 and the bottom-side connection casing 60 are integrated as the one casing, a portion below the middle in the top-to-bottom direction of the one casing is used as a grip portion GP. A user can press the shutter button 22, the power button 51, and the operation buttons 52 to 54 while holding the grip portion GP.

Further, as illustrated in FIGS. 1A and 1B, and 2A and 2B, when the rear-side metal casing 20, the front-side metal casing 30, the left-side connection casing 40, the right-side connection casing 50 and the bottom-side connection casing 60 are integrated as the one casing, an opening OS that is open to the top side is formed. The opening OS is covered by the rear-side resin casing 70, the front-side resin casing 80, and the connection resin casing 90. The rear-side resin casing 70, the front-side resin casing 80 and the connection resin casing 90 can be formed as a composite molded casing composed of a relatively lower rigidity resin material, such as polycarbonate (PC) resin, acrylonitrile butadiene styrene (ABS) resin, or a mixture thereof, compared to the rear-side metal casing 20 and the front-side metal casing 30.

Further, as illustrated in FIGS. 1B, and 2A and 2B, the rear-side resin casing 70 has a curved shape that is fitted into a curved notch of the opening OS formed at a top portion of the rear-side metal casing 20.

Further, as illustrated in FIGS. 1A, and 2A and 2B, the front-side resin casing 80 has a curved shape that is fitted into a curved notch of the opening OS formed at a top portion of the front-side metal casing 30.

As illustrated in FIGS. 2A and 2B, the rear-side resin casing 70 and the front-side resin casing 80 have symmetrical shapes facing the opposite directions with each other in the front-to-rear direction. The connection resin casing 90 has a curved shape that is fitted between the rear-side resin casing 70 and the front-side resin casing 80 with respect to the opening OS formed at the top portion of the rear-side metal casing 20 and the front-side metal casing 30

Further, although not shown in the drawing, a pair of screw hole convex portions is formed at given positions slightly above the lens exposure holes 21 of the rear-side metal casing 20 while the two screw hole convex portions are spaced apart from each other in the left-to-right direction (horizontal direction), and a pair of screw insertion holes, corresponding to the pair of screw hole convex portions, is formed at given positions in the rear-side resin casing 70. By aligning the pair of screw hole convex portions and the pair of screw insertion holes, inserting the pair of screw convex portions into the pair of screw insertion holes, and screwing (tightening) a pair of tightening screws into the pair of screw convex portions and the pair of screw insertion holes, the rear-side metal casing 20 and the rear-side resin casing 70 are connected. The connection structure of the rear-side metal casing 20 and the rear-side resin casing 70 described above can be similarly applied to the connection structure of the front-side metal casing 30 and the front-side resin casing 80.

Figure 4:
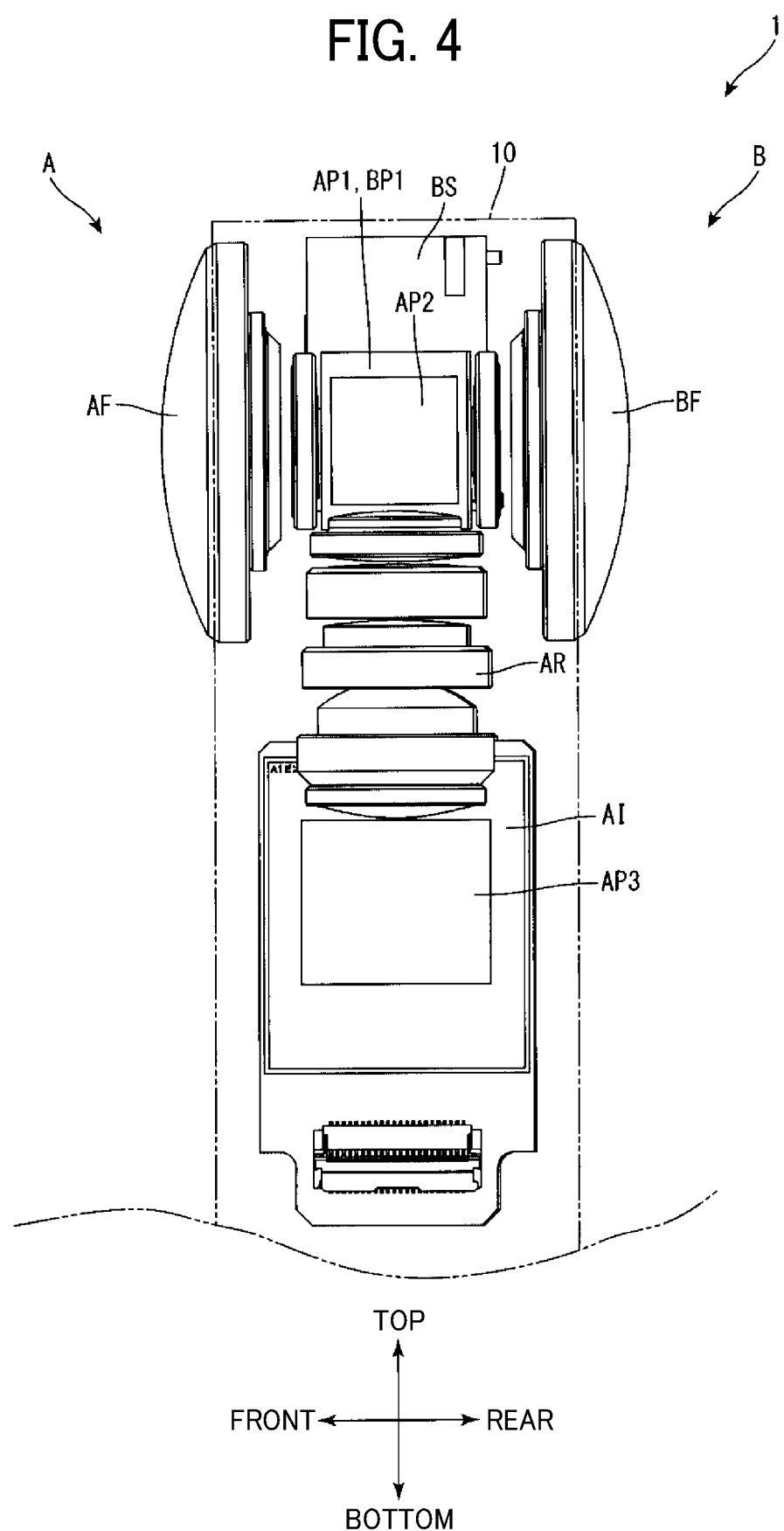
FIG. 4 illustrates a wide-angle lens system and an image sensor disposed inside a casing viewed from a left side.
Figure 5:
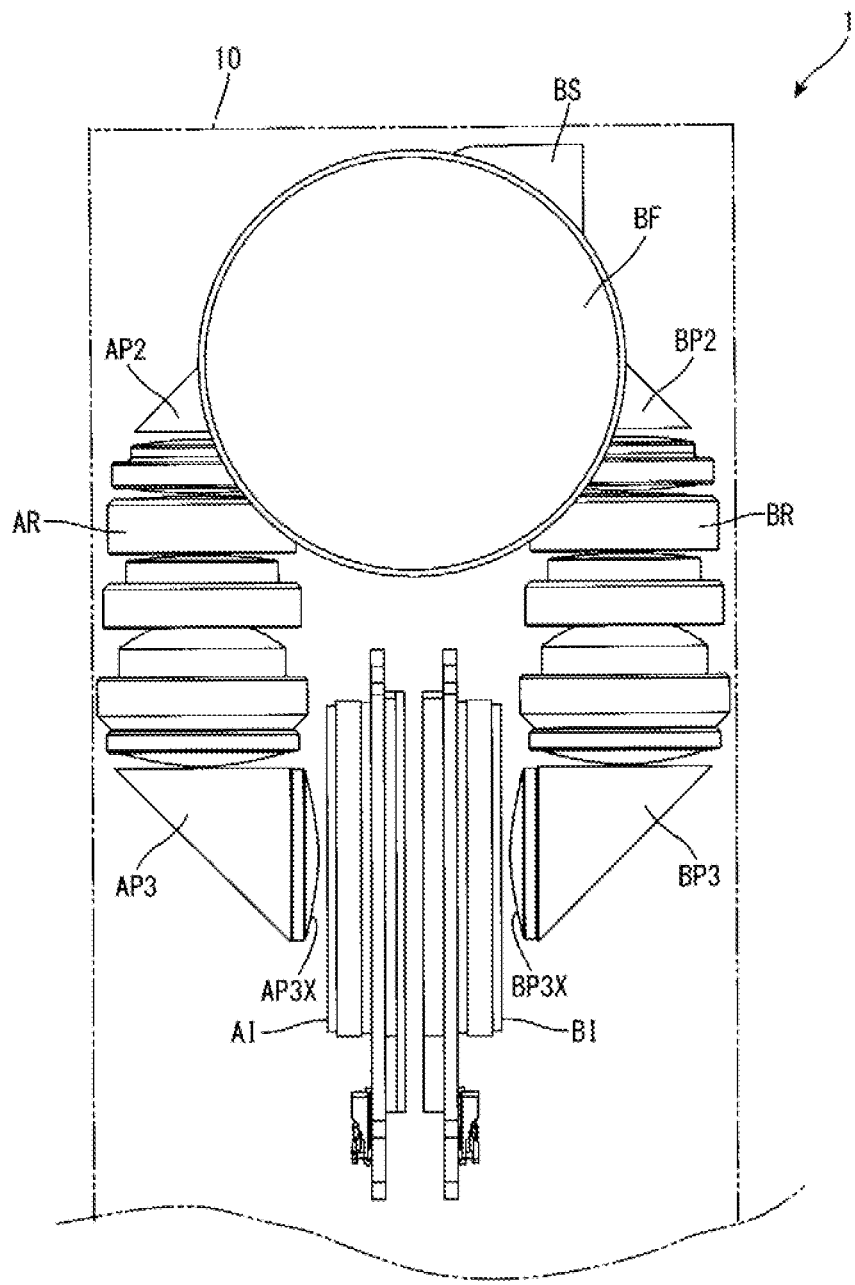
FIG. 5 illustrates a wide angle lens system and an image sensor disposed inside a casing viewed a rear side.
Figure 6:
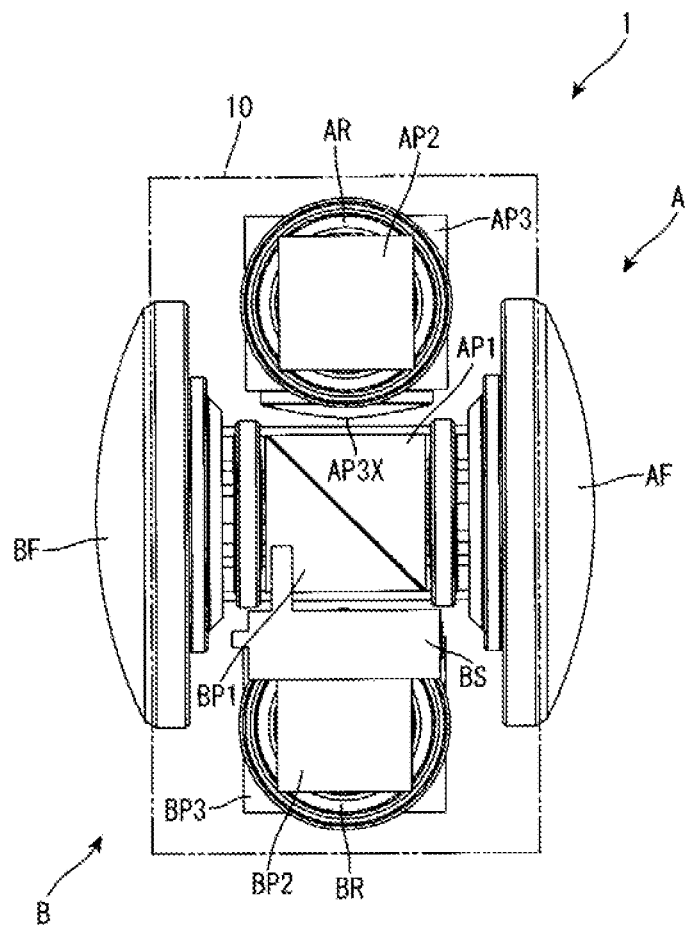
FIG. 6 illustrates a wide angle lens system and an image sensor disposed inside a casing viewed from a top side.
Figure 6:
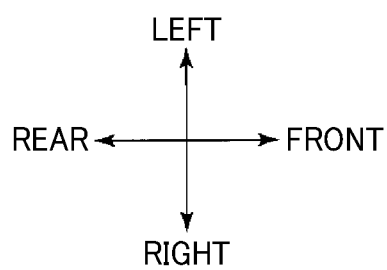

As illustrated in FIGS. 4 to 6, the imaging device 1 includes or houses two wide-angle lens systems A and B (optical systems), and two image sensors AI and BI inside the casing 10. The two wide-angle lens systems A and B are arranged symmetrically with each other inside the casing 10, and images captured by the two wide-angle lens systems A and B are respectively focused and generated on the two image sensors AI and BI. In FIGS. 4 to 6, the casing 10 is schematically drawn with a virtual line (two-point dashed line). The two wide-angle lens systems A and B can be configured using the same design specification, and the image sensors AI and BI can be configured using the same design specification. For example, each of the wide-angle lens systems A and B have an angle of view greater than 180 degrees. The imaging device 1 can be used as an imaging device capable of capturing full-view spherical images by synthesizing two images generated by the image sensors AI and BI as an image having a stereoscopic angle of $4\pi$ radians. The image sensor may be also referred to as the imaging sensor.

Further, as illustrated in FIGS. 4 to 7, the wide-angle lens system A includes, for example, a negative front group AF, a first prism AP1, an aperture AS, a second prism AP2, a positive rear group AR, and a third prism AP3 in the order from an object side to the image sensor. The negative front group AF has a function of capturing light ray corresponding to an angle of view greater than 180°, and the positive rear group AR has a function of correcting aberration of the focused image. The aperture AS is omitted in FIG. 4 to FIG. 6 while illustrated in FIG. 7 alone.

When light flux coming from an object (hereinafter, object light flux) enters the negative front group AF, the negative front group AF emits the object light flux by dispersing the object light flux to a given direction. Then, the first prism AP1 reflects the object light flux, incident from the negative front group AF, by 90° to the left direction. Then, the aperture AS adjusts a passing amount of the object light flux reflected by the first prism AP1 (light amount adjustment). Then, the second prism AP2 reflects the object light flux having the light amount adjusted by the aperture AS by 90° to the downward direction. Then, the positive rear group AR emits the object light flux, reflected by the second prism AP2, to the downward direction while converging the object light flux. Then, the third prism AP3 reflects the object light flux, incident from the positive rear group AR, by 90° to the right direction to focus and generate an image on an imaging plane of the image sensor AI.

Figure 7:
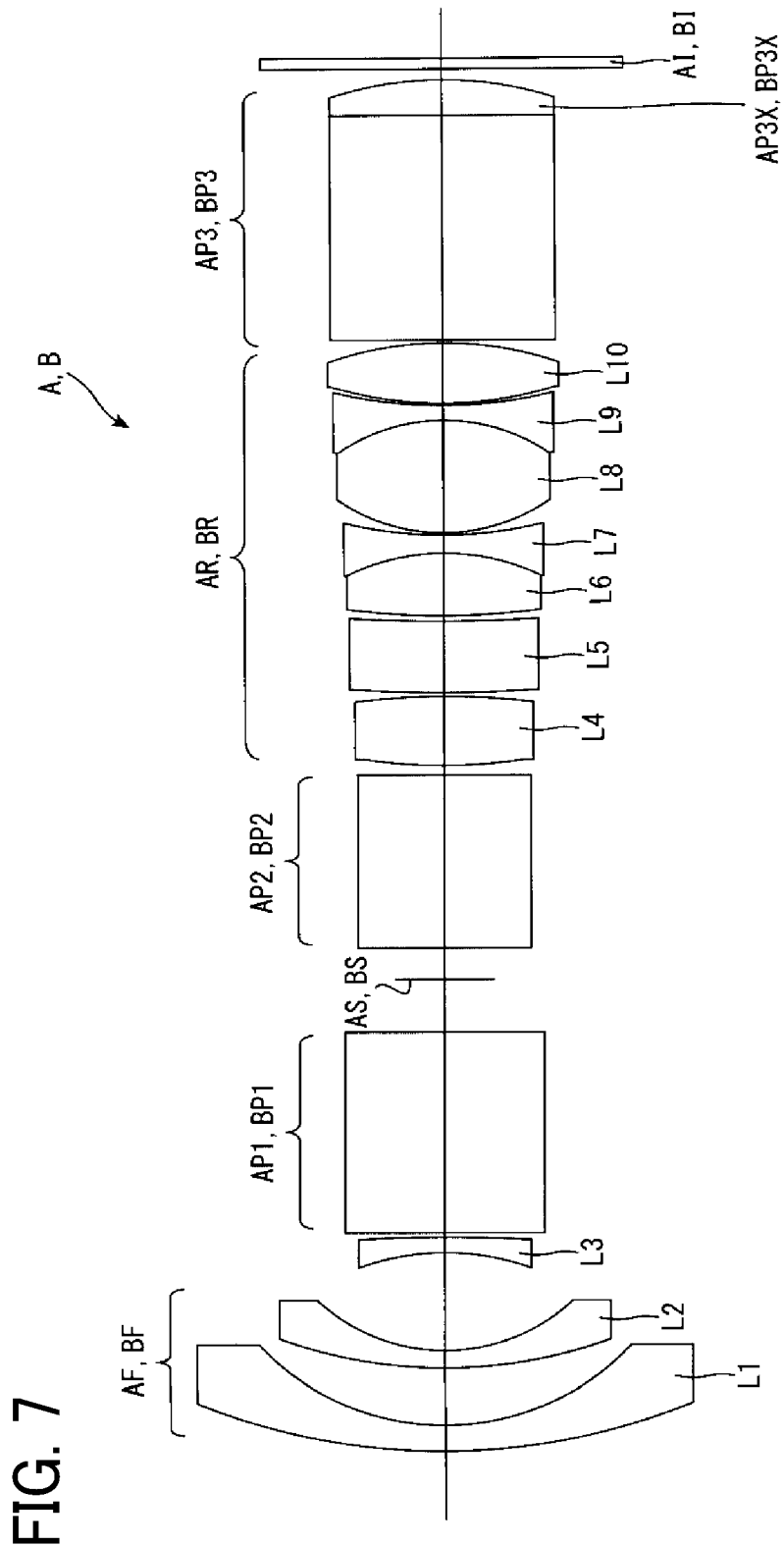
FIG. 7 illustrates a configuration of a wide-angle lens system and an image sensor disposed inside a casing.

As illustrated in FIG. 5, a convex portion AP3X is formed on an exit face of the third prism AP3 while projecting toward the imaging plane of the image sensor AI. As illustrated in FIG. 7, each of the negative front group AF and the positive rear group AR consists of a plurality of lenses, and the plurality of lenses is represented as AF and AR in FIGS. 4 to 6.

As illustrated in FIGS. 4 to 7, the wide-angle lens system B includes, for example, a negative front group BF, a first prism BP1, an aperture BS, a second prism BP2, a positive rear group BR, and a third prism BP3 in the order from an object side to the image sensor. The negative front group BF has a function of capturing light ray corresponding to an angle of view greater than 180°, and the positive rear group BR has a function of correcting aberration of the focused image.

When light fluxes coming from an object (hereinafter, object light flux) enters the negative front group BF, the negative front group BF emits the object light flux by dispersing the object light flux to a given direction. Then, the first prism BP1 reflects the object light flux, incident from the negative front group BF, by 90° to the right direction. Then, the aperture BS adjusts a passing amount of the object light flux reflected by the first prism BP1 (light amount adjustment). Then, the second prism BP2 reflects the object light flux having the light amount adjusted by the aperture BS by 90° to the downward direction. Then, the positive rear group BR emits the object light flux, reflected by the second prism BP2, to the downward direction while converging the object light flux. Then, the third prism BP3 reflects the object light flux, incident from the positive rear group BR, by 90° to the left direction to focus an image on an imaging plane of the image sensor BI.

As illustrated in FIG. 5, a convex portion BP3X is formed on an exit face of the third prism P3 while projecting toward the imaging plane of the image sensor BI. As illustrated in FIG. 7, each of the negative front group BF and the positive rear group BR consists of a plurality of lenses, and the plurality of lenses is represented as BF and BR in FIGS. 4 to 6.

As to the image sensors AI and BI of the wide-angle lens systems A and B disposed in the casing 10, the imaging plane of the image sensor AI faces the left direction, the imaging plane of the image sensor BI faces the right direction, and a back plane (opposite to the imaging plane) of the image sensor AI and a back plane of the image sensor BI face with each other.

FIG. 7 illustrates an example of detailed configuration of the wide angle lens systems A and B and the image sensors AI and BI. FIG. 7 illustrates the configuration by ignoring the reflection directions of the first prism AP1 to the third prism AP3, and the first prism BP1 to the third prism BP3.

Accordingly, the wide-angle lens systems A and B and the image sensors AI and BI in FIG. 7 employ the same (common) configuration.

Each of the negative front group AF and BF includes, for example, a negative meniscus lens L1 having a convex face to the object side, a negative meniscus lens L2 having a convex face to the object side, and a biconcave negative lens L3 in the order from the object side.

Each of the positive rear group AR and BR includes, for example, a biconvex positive lens L4, a positive meniscus lens L5 having a convex face to the object side, a biconvex positive lens L6, a biconcave negative lens L7, a biconvex positive lens L8, a biconcave negative lens L9, and a biconvex positive lens L10. The biconvex positive lens L6 and the biconcave negative lens L7 are joined together. The biconvex positive lens L8 and the biconcave negative lens L9 are joined together.

The above-described structure of the negative front groups AF and BF and the positive rear groups AR and BR is only an example, and various design changes can be made as needed to the configuration of the negative front groups AF and BF and the positive rear group AR and BR. Further, the front groups AF and BF may have the positive power instead of negative power, and the rear groups AR and BR may have the negative power instead of the positive power.

As to the above configured imaging device 1, the negative front group AF of the wide-angle lens system A and the negative front group BF of the wide angle lens system B are disposed along the same (common) optical axis while the negative front group AF of the wide-angle lens system A and the negative front group BF of the wide angle lens system B face the opposite directions in the front-to-rear direction.

Further, the positive rear group AR, which extends in the top-to-bottom direction (vertical direction) after the light path is reflected by each of the first prism AP1 and the second prism AP2 by 90°, and the positive rear group BR, which extends in the top-to-bottom direction (vertical direction) after the light path is reflected by each of the first prism BP1 and the second prism BP2 by 90° are disposed in parallel to each other while spaced apart in the left-to-right direction (horizontal direction).

Further, the image sensor AI disposed at a position after the light path is reflected by the third prism AP3 by 90° and the image sensor BI disposed at a position after the light path is reflected by the third prism BP3 by 90° are disposed in the casing 10 while the imaging plane of the image sensor AI faces the left direction, the imaging plane of the image sensor BI faces the right direction, and a back plane (opposite to the imaging plane) of the image sensor AI and a back plane of the image sensor BI face with each other.

As to the imaging device 1, a lens at the object side of the negative front group AF of the wide-angle lens system A is projected forward (exposed) from the lens exposure hole 31 of the front-side metal casing 30, and a lens at the object side of the negative front group BF of the wide-angle lens system B is projected rearward (exposed) from the lens exposure hole 21 of the rear-side metal casing 20 while other components are accommodated inside the casing 10.

That is, each of the wide-angle lens systems A and B includes the front groups AF and BF, respectively, in the opposite positions in the front-to-rear direction at the upper portion in the casing 10, and the rear groups AR and BR extending in parallel from the upper portion to the lower portion in the casing 10.

Further, each of the wide angle lens systems A and B includes, for example, the prisms such as the first prisms AP1 and BP1, each changes the optical path of the object light flux that has passed through the front groups AF and BF into the left-to-right direction at the upper portion of the casing 10, the second prisms AP2 and BP2, each changes the optical path of the object light flux that has passed through the first prisms AP1 and BP1 into the top-to-bottom direction at the upper portion of the casing 10, and the third prisms AP3 and BP3, each changes the optical path of the object light flux that has passed through the rear groups AR and BR into the left-to-right direction at the lower portion of the casing 10.

With this configuration, the respective components configuring the imaging device 1 can be arranged with a higher layout efficiency, and thereby the imaging device 1 can be designed in compact in size.

Further, each of the first prism AP1 of the wide-angle lens system A and the first prism BP1 of the wide-angle lens system B share one reflection face, common to the wide-angle lens systems A and B. That is, the first prism AP1 and the first prism BP1 set a diagonal face of the first prism AP1 and a diagonal face of the first prism BP1 close to each other to share the reflection face. The reflection face of the wide-angle lens systems A and B consists of a reflective film common to the wide-angle lens systems A and B, and the reflecting film is sandwiched between the diagonal face of the first prism AP1 and diagonal face of the first prism BP1, which are optically equivalent two transparent members. In this state, the first prism AP1 and the first prism BP1 and the reflective film are integrated to form the reflection face common to the wide-angle lens systems A and B. With this configuration, the width of the wide-angle lens systems A and B in the incident optical axis direction can be reduced.

Further, the aperture AS is disposed between the first prism AP1 and the second prism AP2 of the wide-angle lens system A, and the aperture BS is disposed between the first prism BP1 and the second prism BP2 of the wide-angle lens system B. By providing the first prism AP1 and the second prism AP2 near the aperture AS and providing the first prism BP1 and the second prism BP2 near the aperture BS, a smaller right-angle prism can be devised, with which the space between the wide-angle lens systems A and B can be reduced.

Further, a symmetric configuration setting the aperture AS as the center can be devised, in which the first prism AP1 and the second prism AP2 are disposed at both sides of the aperture AS, and the negative front group AF is disposed by facing the first prism AP1 and the positive rear group AR is disposed by facing the second prism AP2, and a symmetric configuration using the aperture BS as the center can be devised, in which the first prism BP1 and the second prism BP2 are disposed at both sides of the aperture BS, and the negative front group BF is disposed by facing the first prism BP1 and the positive rear group BR is disposed by facing the second prism BP2.

Each of the apertures AS and BS employ, for example, a fixed aperture stop, in which the amount of light passing through the aperture is fixed, and a variable aperture stop, in which the amount of light passing through the aperture is variably changed by variably changing the aperture size. Setting the amount of light means determining the amount of light passing through the aperture.

When the amount of light passing through the fixed aperture stop is to be set, the amount of light passing through the fixed aperture is preset, and a specific aperture stop having the preset fixed amount of light is used.

When the amount of light passing through the variable aperture is to be set, a manual light amount setting and an automatic light amount setting can be performed. In the manual light amount setting, the amount of light passing through the aperture is changed and set for each image capturing operation by changing the aperture size by an manual operation of user. In the automatic light amount setting, the amount of light passing through the aperture is changed and set for each image capturing operation by changing the aperture size based on a signal output from the image sensor.

In the embodiment, the position of the aperture AS is set between the first prism AP1 and the second prism AP2, and the position of the aperture BS is set between the first prism BP1 and the second prism BP2, but not limited thereto. For example, the positions of the apertures AS and BS can be set before the first prisms AP1 and BP1, after the second prisms AP2 and BP2, or before or after the third prisms AP3 and BP3.

Further, the apertures AS and BS are not required to be disposed right before or right after the prism as long as the apertures AS and BS are disposed near the prisms. For example, the apertures AS and BS can be disposed between the lenses of the rear group (e.g., between lenses L4 and L5 of the rear group) as long as the above described effect can be attained.

In the embodiment, the number of apertures is one for each of the wide-angle lens systems A and B, but two or more apertures can be se for one wide-angle lens system. For example, a first aperture can be disposed between the first prism AP1 and the second prisms AP2 and a first aperture can be disposed between the first prism BP1 and the second prism BP2, and a second aperture can be disposed after each of the third prisms AP3 and BP3.

Hereinafter, a description is given of an automatic light amount adjustment using the apertures AS and BS as an example of an optical quantity adjustment using the aperture according to the embodiment. An aperture opening size is set for the apertures AS and BS based on the output of the image sensor AI and the image sensor BI. For example, when an imaging system employing the imaging device 1 is used outdoors, a larger amount of sun light enters only one of the wide-angle lens systems A and B, in which the brightness (exposure state) of the wide-angle lens system A and B may become greatly different. If the image captured by the image sensor AI and the image captured by the image sensor BI are synthesized in this state, the boundary between a bright area and a dark area is formed clearly, and thereby full-view spherical images becomes unnatural images. Therefore, in a case when the larger amount of sun light enters only one of the wide-angle lens systems A and B, an aperture size of one wide-angle lens system receiving the larger amount of sun light is set smaller than an aperture size of other wide-angle lens system to adjust the brightness (exposure state) of the wide-angle lens systems A and B at a uniform level, with which full-view spherical images not having the boundary of the bright area and the dark area can be obtained.

As illustrated in FIG. 5, the third prism AP3 of the wide-angle lens system A includes the convex portion AP3X (aspherical face) projecting toward the imaging plane of the image sensor AI, and the third prism BP 3 of the wide-angle lens system B includes the convex portion BP3X (aspherical face) projecting toward the imaging plane of the image sensor BI. Since the wide-angle lens systems A and B have a short focal length, when the last faces of the wide-angle lens system A and B are curved, the back focus becomes longer even when the focal length is short. In order to avoid this issue, the convex portions AP3X and BP3X are provided to change the exit positions. The convex portions AP3X and BP3X can be formed by processing the exit faces of the third prisms AP3 and BP3 as the convex portions, or the convex portions AP3X and BP3X can be formed by attaching convex face lenses, processed separately from the exit faces of the third prisms AP3 and BP3, to the exit faces of the third prisms AP3 and BP3 as the integrated prisms. Alternatively, convex lenses can be provided after the third prisms AP3 and BP3.

Figure 8:
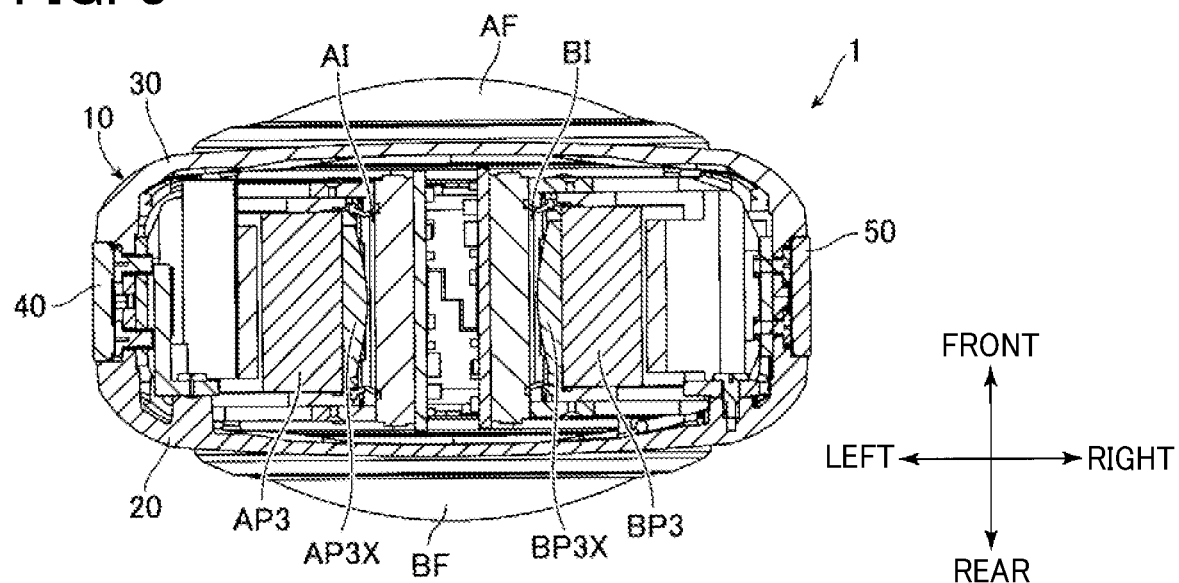
FIG. 8 is a cross-sectional view cut along VIII-VIII line of FIG. 1.
Figure 9:
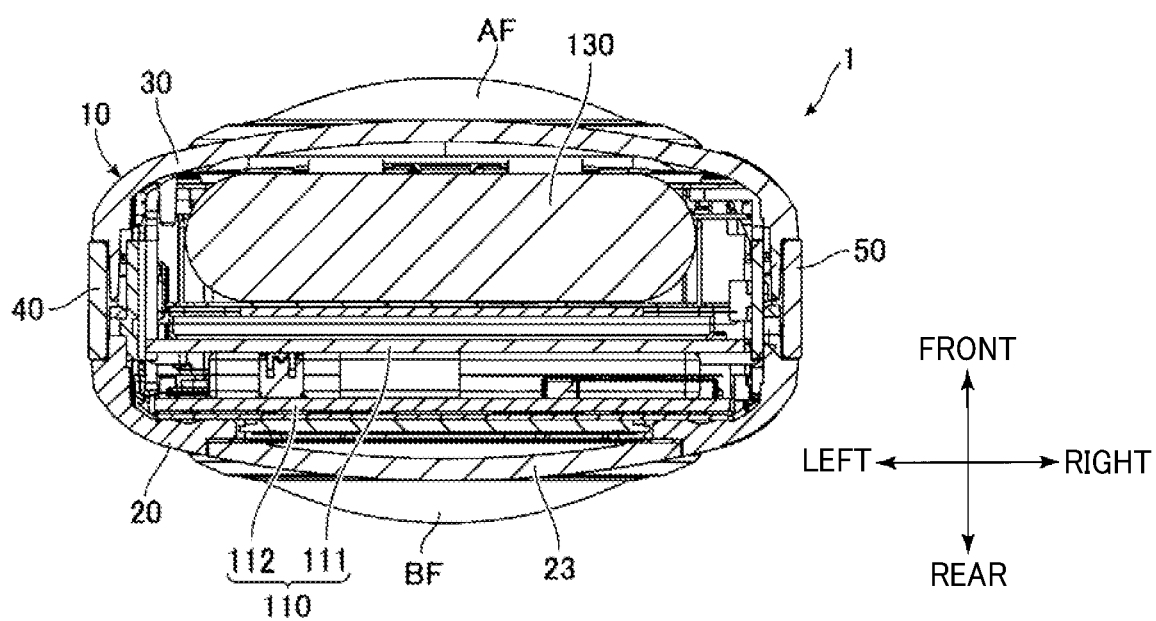
FIG. 9 is a cross-sectional view cut along IX-IX line of FIG. 1.
Figure 10:
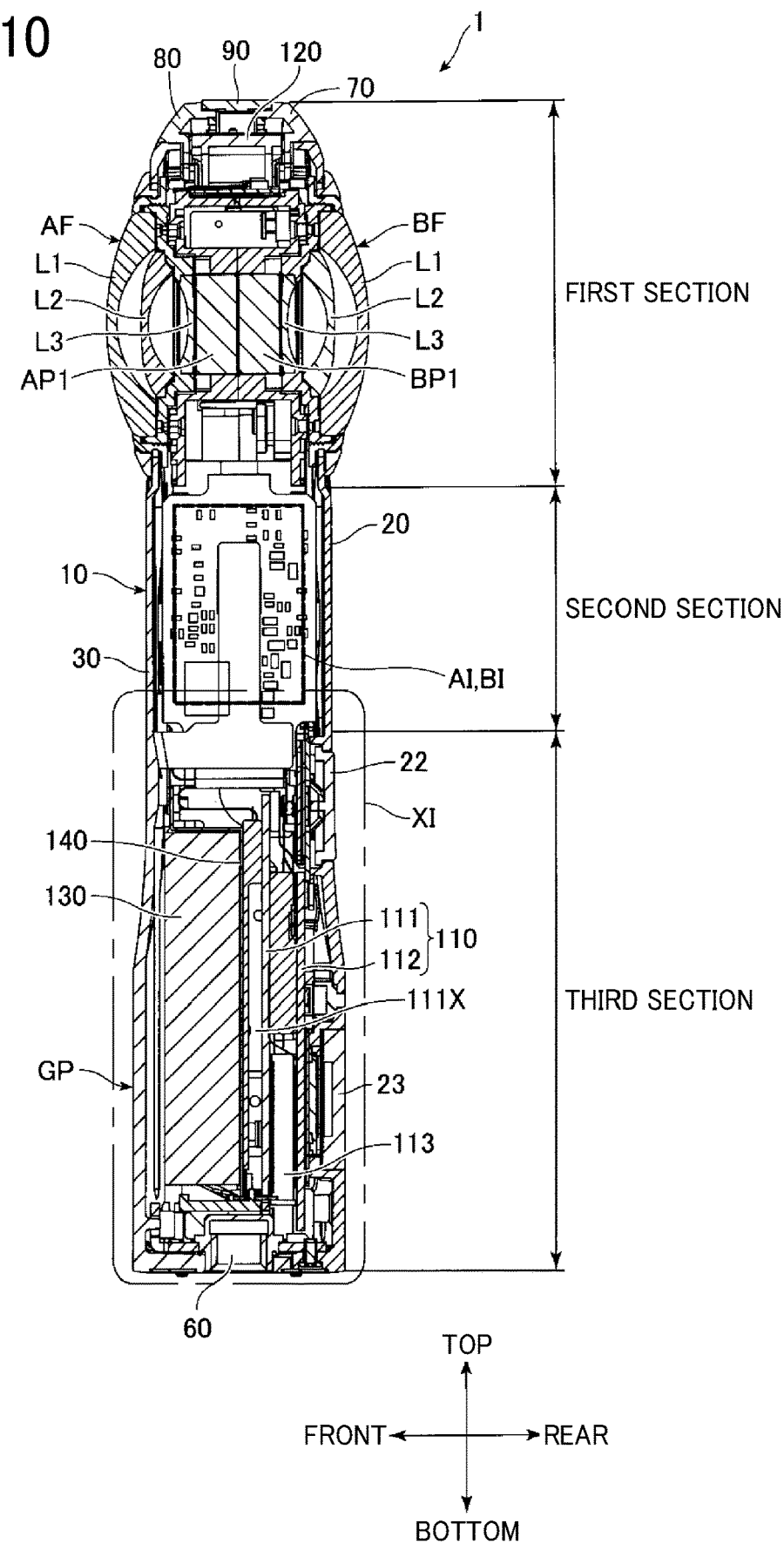
FIG. 10 is a cross-sectional view cut along X-X-line of FIG. 1.
Figure 11:
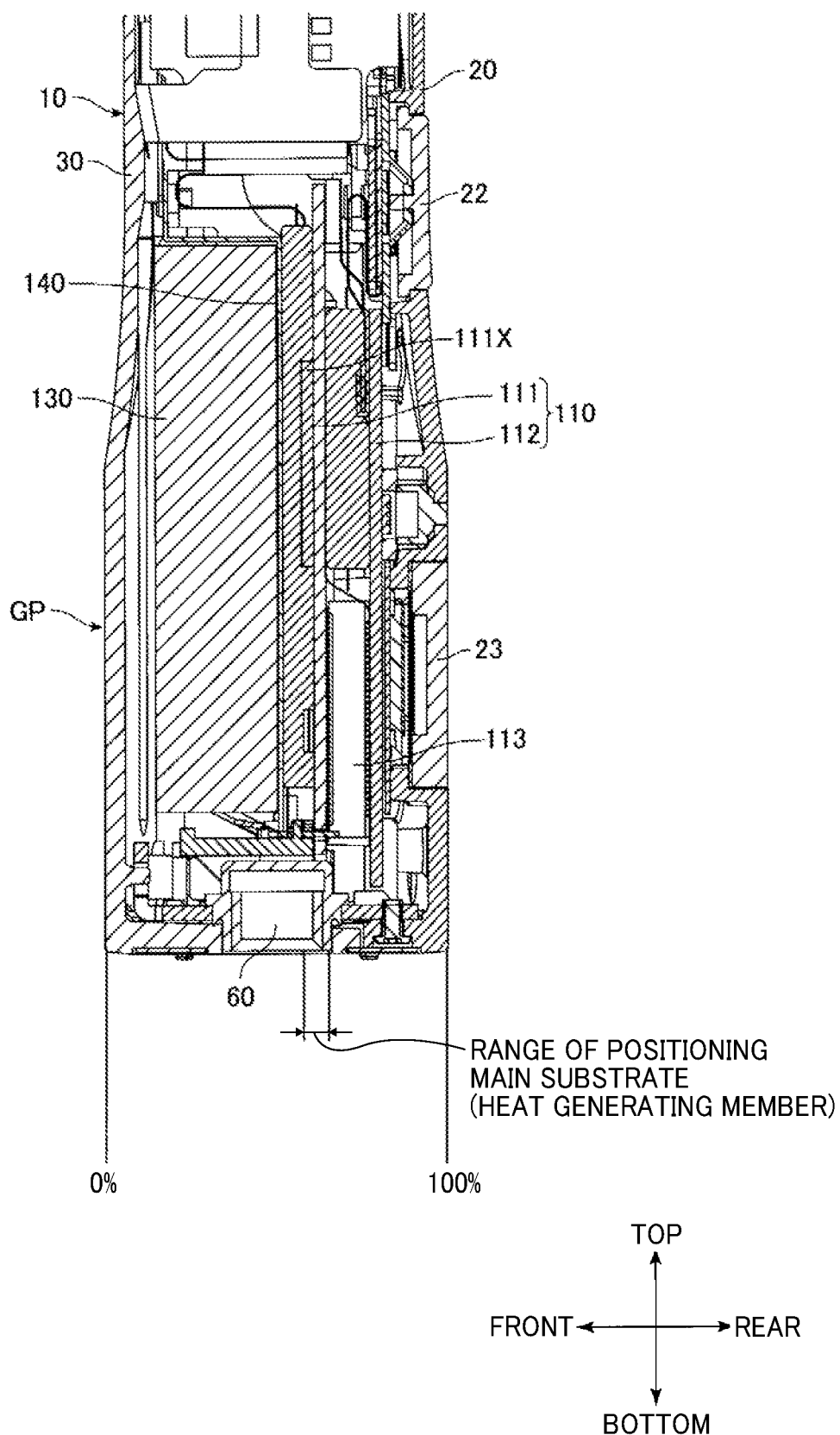
FIG. 11 illustrates an enlarged view of XI section in FIG. 10.

FIGS. 8, 9 and 10 are cross-sectional views, respectively cut along lines VIII-VIII, IX-IX and X-X of FIG. 1. FIG. 11 is a diagram illustrating XI portion of FIG. 10.

As illustrated in FIGS. 9 to 11, a wireless module substrate 110 is disposed at a lower portion of the casing 10 to convert image capture signals output by the image sensors AI and BI into radio or wireless signals. As illustrated in FIGS. 9 to 11, the wireless module substrate 110 includes, for example, a main substrate 111 and a secondary substrate 112, in which the main substrate 111 disposed at a front side and the secondary substrate 112 disposed at a rear side are electrically connected to each other by overlapping the main substrate 111 and the secondary substrate 112 in the front-to-rear direction. The connection between the main substrate 111 and the secondary substrate 112 is established by a connector 113 (FIG. 10) using a board-to-board (BtoB) standard. The main substrate 111 has a substantially rectangular shape having a relatively large-sized plane, and the secondary substrate 112 has a substantially rectangular shape having a relatively small-sized plane.

As illustrated in FIGS. 10 and 11, a digital signal processor (DSP) 111X is mounted on the front face of the main substrate 111, in which the image capture signals output by the image sensor AI and BI are input to the DSP 111X and the processing on the image capture signals is performed by the DSP 111X.

As illustrated in FIGS. 10 and 11, the display unit 23 is electrically connected to the rear face of the secondary substrate 112, and the shutter button 22 is electrically connected to the secondary substrate 112 via flexible printed circuit (FPC).

The main substrate 111 is provided with a transmission member extending upward toward the inner space of the rear-side resin casing 70, the front-side resin casing 80 and the connection resin casing 90. The transmission member can be formed of, for example, a coaxial cable or flexible printed circuit (FPC).

As illustrated in FIG. 10, a communication antenna 120 is provided in the inner space of the rear-side resin casing 70, the front-side resin casing 80 and the connection resin casing 90. One end of the transmission member is connected to the main substrate 111 and the other end of the transmission member is connected to the communication antenna 120. The transmission member transmits the image capture signals captured by the image sensors AI and BI (image capture signals processed by the DSP 111X) to the communication antenna 120, and then the communication antenna 120 transmits the image capture signals to an external device. Further, the communication antenna 120 can transmit and receive various signals to and from the external device.

Although not illustrated, the communication antenna 120 includes, for example, an antenna body and an antenna substrate for holding the antenna body. The antenna body can be formed of, for example, using FPC or rigid FPC. The antenna substrate has a curved shape (arc shape) along the shape of the opening OS formed on the top face of the casing 10 (the rear-side metal casing 20, front-side metal casing 30, left-side connection casing 40, right-side connection casing 50 and bottom-side connection casing 60), and the other end of the transmission member is connected to a top face of the curved shape and the antenna body is attached to the top face of the curved shape.

As illustrated in FIGS. 9 to 11, a battery 130 for supplying power to the respective components of the imaging device 1 is disposed or housed at a lower portion of the casing 10. The position of the battery 130 overlaps the position of the wireless module substrate 110 in the top-to-bottom direction (vertical direction), and the battery 130 is disposed at a front side viewed from the wireless module substrate 110.

As illustrated in FIGS. 10 to 11, a chassis member 140 is disposed between the main substrate 111 of the wireless module substrate 110 and the battery 130, which are adjacent to each other in the front-to-rear direction, in which the chassis member 140 extends in the top-to-bottom direction (vertical direction). The chassis member 140 is bent to the forward direction at a portion above the main substrate 111 of the wireless module substrate 110 and the battery 130, and further bent to the upward direction at the front side of the casing 10 as illustrated in FIGS. 10 and 11.

As described above, the imaging device 1 includes the casing 10, the two wide-angle lens systems A and B (a plurality of optical systems), and the two image sensors AI and BI (a plurality of image sensors), in which the two wide-angle lens systems A and B are disposed and fixed in the casing 10, and the two image sensors AI and BI are disposed and fixed in the casing 10 and used to generate images captured by the two wide-angle lens systems A and B. Further, the casing 10 houses a plurality of components (or large number of components) including, such as the main substrate 111, the secondary substrate 112, and the battery 130.

The main substrate 111 becomes a heat generation member (i.e. heat generation source) that generates heat when the DSP 111X mounted on the main substrate 111 performs an image input processing and image processing, in which the main substrate 111 generates a relatively greater heat amount. The heat generation member can be also referred to as the heat generation source. By contrast, the secondary substrate 112 not mounted with the DSP 111X generates a relatively smaller heat amount compared to the main substrate 111.

In the embodiment, in order to effectively reduce the heat from being conducted or transferred from the main substrate 111 (heat generation member) to the casing 10, the main substrate 111 is disposed at a position at the middle portion (the center portion) in the thickness direction of the casing 10, and the secondary substrate 112 and the battery 130 are disposed at given positions to sandwich the main substrate 111 from the thickness direction, in which the secondary substrate 112 and the battery 130 can be used as a pair of sandwiching members that sandwich the main substrate 111 from the both sides of the main substrate 111. That is, the main substrate 111, which becomes the heat generation member, is disposed between the secondary substrate 112 and the battery 130 used as the pair of sandwiching members in the thickness direction of the casing 10. With this configuration, the heat generated at the main substrate 111 (heat generation member) is dissipated or dispersed to the secondary substrate 112 and the battery 130 used as the pair of sandwiching members. Therefore, the conduction of the heat generated by the heat generation member to the grip portion GP of the casing 10 can be reduced, and thereby users may not have an uncomfortable feeling and the generated heat may not adversely affect the image capturing operation.

Further, by providing the chassis member 140 between the main substrate 111 and the battery 130 and extending in the top-to-bottom direction (vertical direction) while separating the main substrate 111 and the battery 130, the heat conduction from the main substrate 111 to the grip portion GP of the casing 10 can be more effectively reduced. Further, the chassis member 140 can be provided between the main substrate 111 and the secondary substrate 112 as well as between the main substrate 111 and the battery 130.

The main substrate 111, which becomes the heat generation member, and the secondary substrate 112 and the battery 130 used as the pair of sandwiching members may be in contact with each other or may not be in contact with each other. For example, the main substrate 111 (heat generation member) and the secondary substrate 112 and the battery 130 (a pair of sandwiching members) can be connected indirectly via an intermediary member, such as the chassis member 140 described above.

As illustrated in FIG. 11, one end (front end) of the casing 10 in the thickness direction is defined as 0% position, and the other end (rear end) of the casing 10 in the thickness direction is defined as 100% position. The main substrate 111, which serves as the heat generation member, is preferably disposed at a position range of 40% to 60%, more preferably in a position range of 45% to 55%, and more preferably in a position range of 47% to 53%. By satisfying these conditions, the main substrate 111 (heat generation member) can be disposed at a position farthest away from the rear-side metal casing 20 and the front-side metal casing 30 (or a position near the farthest position), with which the heat conduction from the main substrate 111 to the grip portion GP of the casing 10 can be more effectively reduced. In FIG. 11, the main substrate 111 (heat generation member) may not be drawn at the positions satisfying the above conditions, in view of the convenience of the drawing illustration.

As illustrated in FIG. 10, the imaging device 1 including the casing 10 can be segmented into a first section located at a upper portion in the top-to-bottom direction (vertical direction), a second section located at a middle portion in the top-to-bottom direction (vertical direction), and a third section located at a lower portion in the top-to-bottom direction (vertical direction). In this example case, the two wide-angle lens systems A and B (the plurality of optical systems) are disposed in the first section, the two image sensors AI and BI (the plurality of image sensors) are disposed in the second section, and the main substrate 111 (heat generation member), the secondary substrate 112 and the battery 130 (the pair of sandwiching members) are disposed in the third section.

That is, the main substrate 111 (heat generation member), the secondary substrate 112 and the battery 130 (the pair of sandwiching members) are arranged so as to overlap the positions in the top-to-bottom direction (vertical direction) of the casing 10 while the main substrate 111 (heat generation member), the secondary substrate 112 and the battery 130 (the pair of sandwiching members) are arranged so as not to overlap with the positions of the two wide-angle lens systems A and B (the plurality of optical systems) disposed in the first section, and the positions of the two image sensors AI and BI (the plurality of image sensors) disposed in the top-to-bottom direction (vertical direction) of the casing 10. With this configuration, the two wide-angle lens systems A and B (the plurality of optical systems), the two image sensors AI and BI (the plurality of image sensors), the main substrate 111, the secondary substrate 112 and the battery 130 can be arranged with a higher layout efficiency inside the casing 10.

The imaging device 1 includes the shutter button 22, the display unit 23, the microphones 24 and 32, the speaker 41, the power button 51, and the operation buttons 52, 53, 54, or at least one of these as one or more elements disposed on an exterior of the casing 10. With this configuration, the exterior of the casing 10 can be formed in compact in size and good appearance.

Figure 12:
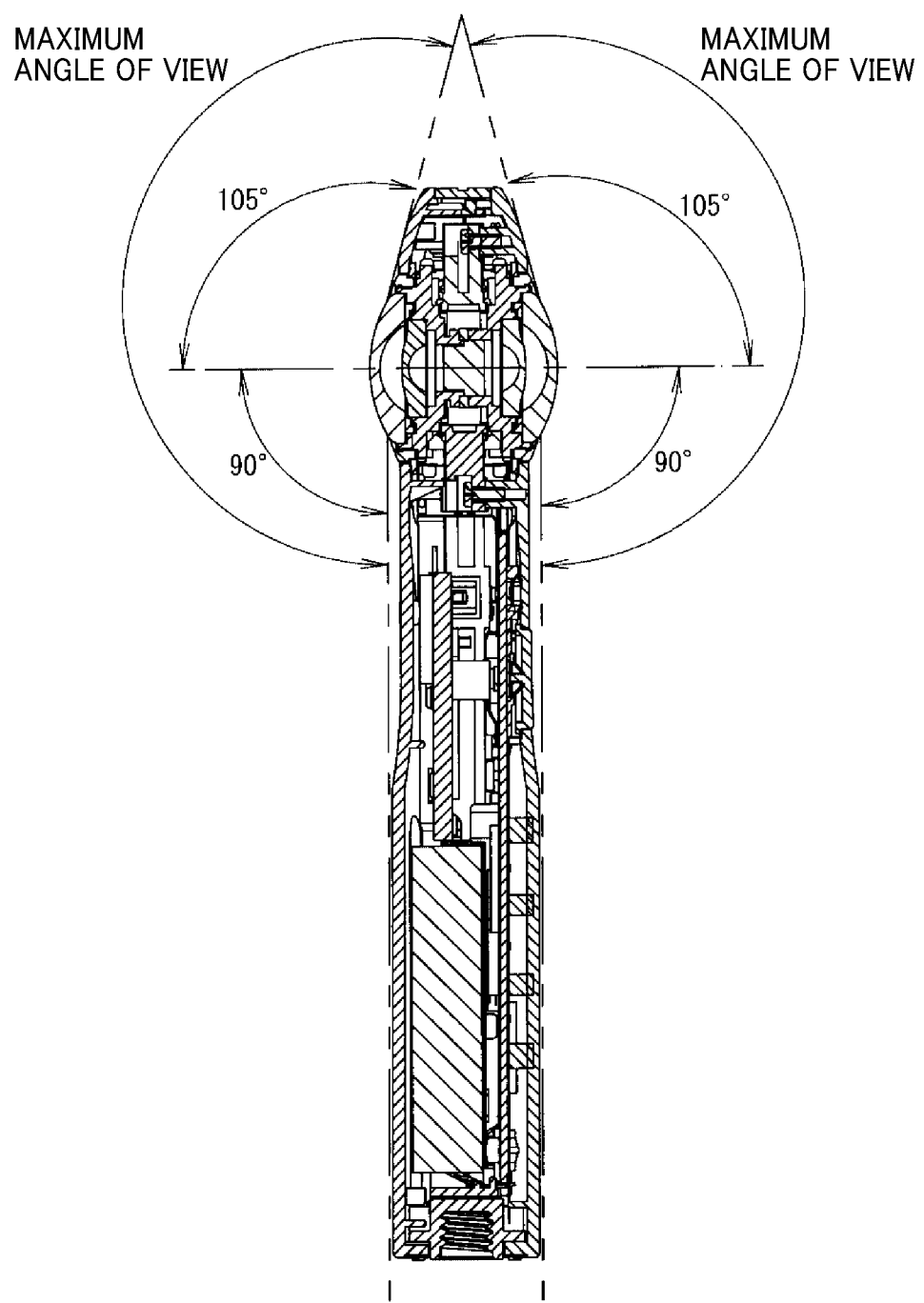
FIG. 12 illustrates an example of a maximum angle of view set by two wide-angle lens systems.

FIG. 12 illustrates an example of a maximum angle of view set by the two wide-angle lens systems A and B. As illustrated in FIG. 12, a shape of the casing 10 is designed so as not to interfere the maximum angle of view of the two wide-angle lens systems A and B.

As to conventional digital camera, since a layout space inside a casing of digital camera is relatively large, the first heat storage member can be disposed inside the grip portion, and the second heat storage member can be disposed near the strobe device section away from the grip portion.

However, the imaging device 1 is an imaging device capable of capturing full-view spherical images by synthesizing two images generated by the two wide-angle lens systems A and B and the two image sensors AI and BI as an image having a stereoscopic angle of 4π radians. Therefore, the layout space inside the casing 10 is relatively small, in which if the heat storage member is to be arranged inside the casing 10, the casing 10 becomes larger for the size of the heat storage member, and then the casing 10 may interfere the maximum angle of view of the two wide-angle lens systems A and B. In this case, an image of a part of the casing 10 is included in the captured image, and the quality of the captured image deteriorates.

In the embodiment, the exterior and interior of the casing 10 can be formed in compact in size and good appearance, and the main substrate 111 (heat generation member) is positioned at the middle portion (the center portion) in the thickness direction of the casing 10, and the secondary substrate 112 and the battery 130 are disposed at given positions to sandwich the main substrate 111 from the thickness direction, in which the secondary substrate 112 and the battery 130 can be used as the pair of sandwiching members that sandwich the main substrate 111 from the both sides of the main substrate 111. Therefore, compared to simply disposing the heat storage member in the casing 10 with little consideration of the position of the heat storage member, the heat conduction from the main substrate 111 to the casing 10 can be efficiently reduced, the casing 10 can be formed in compact in size so as not to interfere the maximum angle of view of the two wide-angle lens systems A and B, and thereby preventing the capturing of the image of a part of the casing 10.

In an example case of FIG. 12, in view of the shape of the casing 10, an angle of view of the upper side of the two wide-angle lens systems A and B is set 105° by setting the optical axis of the front groups AF and BF as the center axis, and an angle of view of the lower side of the two wide-angle lens systems A and B is set 90° by setting the optical axis of the front groups AF and BF as the center axis. Then, the casing 10 is not located inside the maximum angle of view, which is a combination of the angle of view of the upper side and the angle of view of the lower side (image of a part of the casing 10 is not included in the captured image).

As to the above described imaging device of the embodiment, the heat conduction from the heat generation member to the casing can be efficiently reduced.

In the above described embodiment, the imaging device 1 includes the two wide-angle lens systems A and B, but the number of wide-angle lens systems mounted on the imaging device 1 is not limited to two, but can be three or more. In this case, the number of image sensors mounted on the imaging device 1 can be set equal to the number of wide-angle lens systems.

In the above described embodiment, the main substrate 111 is referred to as the "heat generation member" and the secondary substrate 112 and the battery 130 are referred to as "the pair of sandwiching members." However, these relationships are only one example. As long as the "heat generation member" is positioned at the middle portion in the thickness direction of the casing 10, and the "pair of sandwiching members" is positioned to sandwich the opposite faces of the heat generation member in the casing 10, any configuration can be applied.

In the above described embodiment, the main substrate 111 (heat generation member) is arranged between the secondary substrate 112 and the battery 130 (the pair of sandwiching members) in the thickness direction of the casing 10, but is not limited thereto. A direction in which the heat generation member is positioned between the pair of sandwiching members (the direction in which the pair of sandwiching members sandwich the heat generation member) is not limited to the thickness direction of the casing 10, but can be any direction in the casing 10.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

What is claimed is:

1. An imaging device comprising:
a casing;
a plurality of optical systems disposed in the casing;
a plurality of image sensors disposed in the casing and configured to generate images from the plurality of optical systems;
a heat generator disposed in the casing; and
a pair of elements disposed in the casing to sandwich the heat generator between the pair of elements,
wherein when one end and another end of the casing along a thickness direction of the casing are respectively defined as 0% position and 100% position, the heat generator is disposed at a position range from 40% to 60% along the thickness direction of the casing.

2. The imaging device according to claim 1,
wherein the heat generator is disposed between the pair of elements along the thickness direction of the casing.

3. The imaging device according to claim 1,
wherein the heat generator and the pair of elements are arranged so as to overlap in a top-to-bottom direction of the casing, and the heat generator and the pair of elements are arranged so as not to overlap with the plurality of optical systems and the plurality of image sensors in the top-to-bottom direction.

4. The imaging device according to claim 1,
wherein the heat generator includes a main substrate that receives an input of signals from the plurality of image sensors, and the pair of elements includes a secondary substrate connected to the main substrate and a battery for supplying power to components of the imaging device.

5. The imaging device according to claim 1,
wherein the casing is shaped so as not to interfere a maximum angle of view of the plurality of optical systems.

6. The imaging device according to claim 1,
wherein the casing includes at least any one of a shutter button, a display, a microphone, a speaker, a power button and an operation button as one or more components disposed on an exterior of the casing.

7. An imaging device comprising:
a casing having a length;
a plurality of optical systems disposed in the casing, each of the plurality of optical systems including a lens which is at an end of the imaging device along a length direction;
a plurality of image sensors disposed in the casing and configured to generate images from the plurality of optical systems;
a grip;
a heat generator disposed in the casing such that the grip surrounds at least a portion of the heat generator; and
a pair of elements disposed in the casing to sandwich the heat generator between the pair of elements to shield heat originating from the heat generator from the grip.

8. The imaging device according to claim 7,
wherein the heat generator is disposed between the pair of elements along a thickness direction of the casing.

9. The imaging device according to claim 7,
wherein the heat generator and the pair of elements are arranged so as to overlap in a top-to-bottom direction of the casing, and the heat generator and the pair of elements are arranged so as not to overlap with the plurality of optical systems and the plurality of image sensors in the top-to-bottom direction.

10. The imaging device according to claim 7,
wherein when one end and another end of the casing along a thickness direction of the casing are respectively defined as 0% position and 100% position, the heat generator is disposed at a position range from 40% to 60% along the thickness direction of the casing.

11. The imaging device according to claim 7,
wherein the heat generator includes a main substrate that receives an input of signals from the plurality of image sensors, and the pair of elements includes a secondary substrate connected to the main substrate and a battery for supplying power to components of the imaging device.

12. The imaging device according to claim 7,
wherein the casing is shaped so as not to interfere a maximum angle of view of the plurality of optical systems.

13. The imaging device according to claim 7,
wherein the casing includes at least any one of a shutter button, a display, a microphone, a speaker, a power button and an operation button as one or more components disposed on an exterior of the casing.

14. The imaging device according to claim 7,
wherein the casing includes at least any one of a shutter button, a power button and an operation button which a user can press with a hand which is holding the grip.

15. The imaging device according to claim 7,
wherein the heat generator includes a main substrate,
wherein one of the pair of elements is a battery, and a chassis is between the main substrate and the battery.

16. The imaging device according to claim 7,
wherein the heat generator and the pair of elements are arranged so as to overlap in a top-to-bottom direction of the casing, and the heat generator and the pair of elements are arranged so as not to overlap with the plurality of optical systems and the plurality of image sensors in the top-to-bottom direction.

17. An imaging device comprising:
a casing;
a plurality of optical systems disposed in the casing, the plurality of optical systems being opposed to each other along a front-to-rear direction of the casing, directions of optical axes of the optical systems which are opposed to each other is a thickness direction of the casing;
a plurality of image sensors disposed in the casing and configured to generate images from the plurality of optical systems;
a heat generator disposed in the casing; and
a pair of elements disposed in the casing to sandwich the heat generator between the pair of elements,
wherein the heat generator is disposed between the pair of elements along the thickness direction of the casing.

18. The imaging device according to claim 17,
wherein the heat generator and the pair of elements are arranged so as to overlap in a top-to-bottom direction of the casing, and the heat generator and the pair of elements are arranged so as not to overlap with the plurality of optical systems and the plurality of image sensors in the top-to-bottom direction.

19. The imaging device according to claim 17,
wherein the heat generator includes a main substrate,
wherein one of the pair of elements is a battery, and a chassis is between the main substrate and the battery.

20. The imaging device according to claim 17,
wherein the heat generator includes a main substrate that receives an input of signals from the plurality of image sensors, and the elements includes a secondary substrate connected to the main substrate and a battery for supplying power to components of the imaging device.

* * * * *